A. HYLAND.
Improvement in Files.
No. 114,824.  Patented May 16, 1871.
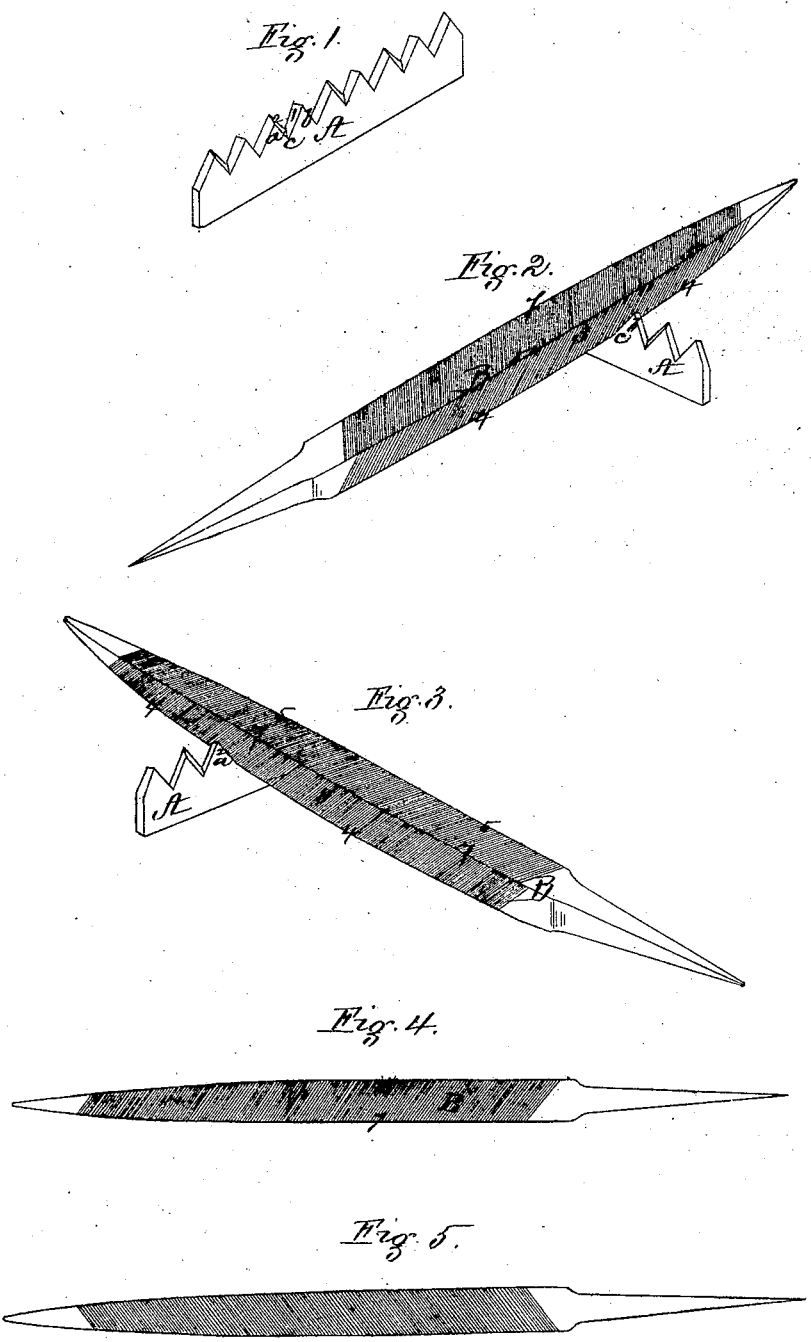

United States Patent Office.

AMASA HYLAND, OF HINGHAM, MASSACHUSETTS.

Letters Patent No. 114,824, dated May 16, 1871.

IMPROVEMENT IN FILES.

The Schedule referred to in these Letters Patent and making part of the same.

*To all whom it may concern:*

Be it known that I, AMASA HYLAND, of Hingham, in the county of Plymouth and State of Massachusetts, have invented an Improvement in Files, of which the following is a full, clear, and exact description, reference being had to the accompanying drawing making a part of this specification, in which—

Figure 1 is a perspective view of the teeth of a portion of a saw enlarged.

Figure 2 is a perspective view of the same, showing the application of my improved file in sharpening the saw, the right-hand side of the file being exposed to view.

Figure 3 is a perspective of the opposite side of the teeth of the saw, exposing to view the left-hand side of my improved file.

Figure 4, a plan (enlarged) of a portion of the upper side of my improved file.

Figure 5, a plan (enlarged) of a portion of the upper side of an ordinary three-cornered file.

Three-cornered files for sharpening saws, &c., have heretofore been provided with a "right-hand cut"—that is to say, the cut is made from left to right relative to the point.

To the use of this description of files there is, however, the following objection:

In the ordinary process of filing the operator naturally exerts a greater pressure from him than toward him, or upon the tooth of the saw to the right of the file than on the saw-tooth on the left of the file, which circumstance, together with the fact of the teeth of the file on the left side pitching down toward the point, and the teeth of the file on the right side pitching down toward the tang, causes the tooth of the saw on the right of the file to be filed off faster than the saw-tooth on the left, and consequently the alternate teeth of the saw have their tops or points worn down, which reduces their length, and the saw is uneven, not so effective, and soon becomes useless.

To overcome the above-mentioned difficulties is the object of my invention, which consists in a three-cornered file provided with a "left-hand cut"—that is, a series of teeth, the direction of which is from right to left relative to the point, by which arrangement the tendency of the operator to press the file from him and cut into and wear off the point of the tooth of the saw to the right of the file is counteracted by the tendency of the teeth of the file on that side to ride up instead of working down against the said tooth of the saw, while at the same time, although the inclination of the file-teeth on the left side tends to cause them to work down into the saw-tooth on the left, this tendency is also counteracted by the file bearing more lightly thereon than on the saw-tooth to the right of the file, and the result is that both sides of contiguous saw-teeth are equally sharpened and reduced, instead of unevenly reduced, as before, and the saw is uniformly and gradually cut away by the operation of filing.

To enable others skilled in the art to understand and use my invention, I will proceed to describe the manner in which I have carried it out.

In the said drawing—

A represents a portion of a saw whose teeth $a$ $b$ are to be filed by moving a three-cornered file, B, provided with a left-hand cut (see figs. 2, 3, and 4) in the notch $c$, between the side 2 of the saw-tooth $a$, and the side 1 of the saw-tooth $b$.

The file bears harder on the side 1 of the saw-tooth $b$ than on the side 2 of the saw-tooth $a$, but the pitch or cut of the teeth of the file on the right-hand side 3 being from its lower edge 4 outward toward the point of the file up to its upper right-hand edge 5, (see fig. 2,) and the pitch of the teeth of the file on its left-hand side 6 being reversed, or from the lower edge 4, in toward the tang to its upper left-hand edge 7, (see fig. 3,) the tendency to press harder on the right-hand saw-tooth $b$ is offset by the file readily slipping up thereon, and the tendency of the operator to bear lightly on the side of the saw-tooth $a$ on the left is counteracted by the tendency of the teeth of the file on the left side 6 to run down and hold harder thereon, the result being to evenly sharpen and equally reduce the opposite sides of every tooth, and the entire series of the saw-teeth is gradually and uniformly reduced in contradistinction to the irregular teeth of a saw sharpened by the ordinary right-hand cut file C, (see fig. 5,) as heretofore.

Claim.

What I claim as my invention, and desire to secure by Letters Patent, is—

A three-cornered file having a "left-hand cut," substantially as and for the purpose set forth.

Witness my hand this 1st day of November, A. D. 1870.

AMASA HYLAND.

Witnesses:
N. W. STEARNS,
L. E. BATCHELLER.